United States Patent
Hatanaka et al.

(10) Patent No.: US 9,553,625 B2
(45) Date of Patent: Jan. 24, 2017

(54) MODULAR FUNCTIONAL BAND LINKS FOR WEARABLE DEVICES

(71) Applicant: Apple Inc., Cupertino, CA (US)

(72) Inventors: Motohide Hatanaka, Tokyo-to (JP); Douglas J. Weber, Cupertino, CA (US); Brian Shadle, Cupertino, CA (US); Alex M. Lee, Cupertino, CA (US); David S. Herman, Cupertino, CA (US); Patrick S. Wieler, Cupertino, CA (US); Simon R. Lancaster-Larocque, Gloucester (CA)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/623,683

(22) Filed: Feb. 17, 2015

(65) Prior Publication Data

US 2016/0094259 A1 Mar. 31, 2016

Related U.S. Application Data

(60) Provisional application No. 62/056,517, filed on Sep. 27, 2014.

(51) Int. Cl.
*H04B 1/38* (2015.01)
*H04B 1/3827* (2015.01)
(Continued)

(52) U.S. Cl.
CPC ............... *H04B 1/385* (2013.01); *A44C 5/00* (2013.01); *A44C 5/0007* (2013.01); *A44C 5/02* (2013.01);
(Continued)

(58) Field of Classification Search
CPC ..................................................... H04B 1/385
(Continued)

(56) References Cited

U.S. PATENT DOCUMENTS 3,973,706 A 8/1976 Boyce et al.
5,361,241 A 11/1994 Ferrara et al.
(Continued)

FOREIGN PATENT DOCUMENTS

DE 3813409 11/1989
WO WO2014/134497 9/2014

OTHER PUBLICATIONS

Author Unknown, "Build the Smartwatch of Your Dreams with this Modular Wearable," http://www.dvice.com/2014-3-7/build-smartwatch-your-dreams-modular-wearable, 2 pages, at least as early as Jul. 23, 2014.
(Continued)

*Primary Examiner* — April G Gonzales
(74) *Attorney, Agent, or Firm* — Sterne, Kessler, Goldstein & Fox P.L.L.C.

(57) ABSTRACT

A wearable device is coupled to a band including multiple modular functional band links that are each electrically and mechanically connected to one or more other of the band links and/or the wearable device and include one or more electronic components. In various implementations, the wearable device may receive identifiers from each of the band links, determine functionality available using the identifiers, and communicate with the band links to utilize the determine functionality. In some implementations, the band links may include multiple different output devices and the wearable device may determine to provide an output pattern and signal the respective output devices according to the output pattern. In various implementations, the band links may include multiple different input devices and the wearable device may receive input indications from the input devices and perform an action based on a pattern in which the input indications were detected by the respective input devices.

20 Claims, 9 Drawing Sheets

(51) Int. Cl.
*A44C 5/00* (2006.01)
*G04G 17/08* (2006.01)
*G04G 21/00* (2010.01)
*G06F 1/16* (2006.01)
*A44C 5/02* (2006.01)
*G04B 47/00* (2006.01)
*H04M 1/725* (2006.01)
*H04W 52/02* (2009.01)

(52) U.S. Cl.
CPC ............ *G04G 17/083* (2013.01); *G04G 21/00* (2013.01); *G06F 1/163* (2013.01); *G04B 47/00* (2013.01); *H04B 2001/3861* (2013.01); *H04M 1/72527* (2013.01); *H04W 52/0277* (2013.01)

(58) Field of Classification Search
USPC ...................................... 455/41.2, 90.3, 90.2
See application file for complete search history.

(56) References Cited

U.S. PATENT DOCUMENTS

| | | | |
|---|---|---|---|
| 5,872,744 A | 2/1999 | Taylor | |
| 6,619,835 B2 | 9/2003 | Kita | |
| 7,130,664 B1 | 10/2006 | Williams | |
| 7,190,775 B2 | 3/2007 | Rambo | |
| 7,463,205 B2 | 12/2008 | Turner et al. | |
| 7,618,260 B2 * | 11/2009 | Daniel | A44C 5/0007 24/311 |
| D617,661 S * | 6/2010 | Nara | D10/31 |
| 8,098,141 B2 * | 1/2012 | Vanska | G06F 1/163 340/407.1 |
| 8,303,151 B2 | 11/2012 | Pance et al. | |
| 8,345,414 B2 * | 1/2013 | Mooring | G04G 17/04 248/441.1 |
| 8,401,178 B2 | 3/2013 | Chen et al. | |
| 8,467,270 B2 * | 6/2013 | Gossweiler, III | G04G 17/06 345/173 |
| 8,712,383 B1 | 4/2014 | Hayes et al. | |
| 8,851,372 B2 * | 10/2014 | Zhou | G06F 1/163 235/380 |
| 9,000,887 B2 | 4/2015 | Linsky et al. | |
| 9,016,565 B2 * | 4/2015 | Zhou | G06Q 20/355 235/380 |
| 9,024,749 B2 | 5/2015 | Ratajczyk | |
| 9,141,086 B1 * | 9/2015 | Rohrbach | G04B 37/1486 |
| 2004/0224223 A1 * | 11/2004 | Sun | H01M 2/1061 429/127 |
| 2007/0230712 A1 | 10/2007 | Belt et al. | |
| 2010/0321899 A1 * | 12/2010 | Vossoughi | B60R 11/02 361/728 |
| 2012/0108215 A1 | 5/2012 | Kameli | |
| 2013/0225915 A1 | 8/2013 | Redfield et al. | |
| 2013/0262298 A1 | 10/2013 | Morley | |
| 2014/0180582 A1 | 6/2014 | Pontarelli et al. | |
| 2014/0313040 A1 | 10/2014 | Wright, Sr. | |
| 2015/0155730 A1 | 6/2015 | Miller et al. | |
| 2015/0163339 A1 | 6/2015 | Fenton | |

OTHER PUBLICATIONS

International Search Report, PCT/US2015/049007, 11 pages, Nov. 17, 2015.

* cited by examiner

MODULAR FUNCTIONAL BAND LINKS FOR WEARABLE DEVICES

CROSS-REFERENCE TO RELATED APPLICATION

This application is a nonprovisional patent application of and claims the benefit to U.S. Provisional Patent Application No. 62/056,517, filed Sep. 27, 2014 and titled "Modular Functional Band Links for Wearable Devices," the disclosure of which is hereby incorporated herein by reference in its entirety.

TECHNICAL FIELD

This disclosure relates generally to wearable devices, and more specifically to modular functional band links for wearable devices.

BACKGROUND

Wearable devices are generally electronic devices such as heart rate monitors or other electronic devices that are configured to be worn on a user's body part, such as a wrist or arm. Such wearable devices may be configured to perform various functions.

However, due to the fact that wearable devices are typically worn on a body part of a user, there may be limited space available for functional components of the wearable device. Further, wearable devices are not usually expandable beyond their initial design to meet functional needs of individual different users.

SUMMARY

The present disclosure details systems, apparatuses, and methods related to modular functional band links for wearable devices. A wearable device may be electrically and mechanically coupled to a band including multiple modular functional band links that are each electrically and mechanically connected to one or more other of the modular functional band links and/or the wearable device. Each of the modular functional band links may include one or more electronic components.

In various implementations, the wearable device may receive identifiers from each of the modular functional band links, determine functionality available using the identifiers, and communicate with one or more of the modular functional band links to utilize the determine functionality. In some implementations, the modular functional band links may include multiple output devices and the wearable device may determine to provide an output pattern and signal the respective output devices according to the output pattern. In various implementations, the modular functional band links may include multiple different input devices and the wearable device may receive input indications from the input devices and perform an action based on a pattern in which the input indications were detected by the respective input devices.

In some embodiments, a band system for a wearable device may include a wearable device and multiple modular functional band links that each include an electronic component and electrically and mechanically connect to at least one of the wearable device or another of the multiple modular functional band links. The wearable device may: receive identifiers from each of the multiple modular functional band links, determine functionality available via the multiple modular functional band links utilizing the received identifiers, and communicate with one of the multiple modular functional band links to utilize the determined functionality.

In various embodiments, a band system for a wearable device may include a wearable device and multiple modular functional band links that electrically and mechanically connect to at least one of the wearable device or another of the multiple modular functional band links. The multiple modular functional band links may each include an input component and the wearable device may receive input indications from the multiple modular functional band links and perform an action based on a pattern in which the input indications were detected by the respective modular functional band links. Alternatively, The multiple modular functional band links may each include an output component and the wearable device may determine to provide an output pattern using the multiple modular functional band links and signal the multiple modular functional band links according to the pattern.

In one or more embodiments, a method for utilizing functional components of band system for a wearable device may include: receiving identifiers at a wearable device from multiple modular functional band links connected to the wearable device, determining functionality available via the multiple modular functional band links utilizing the received identifiers, and communicating with one of the multiple modular functional band links to utilize the determined functionality.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
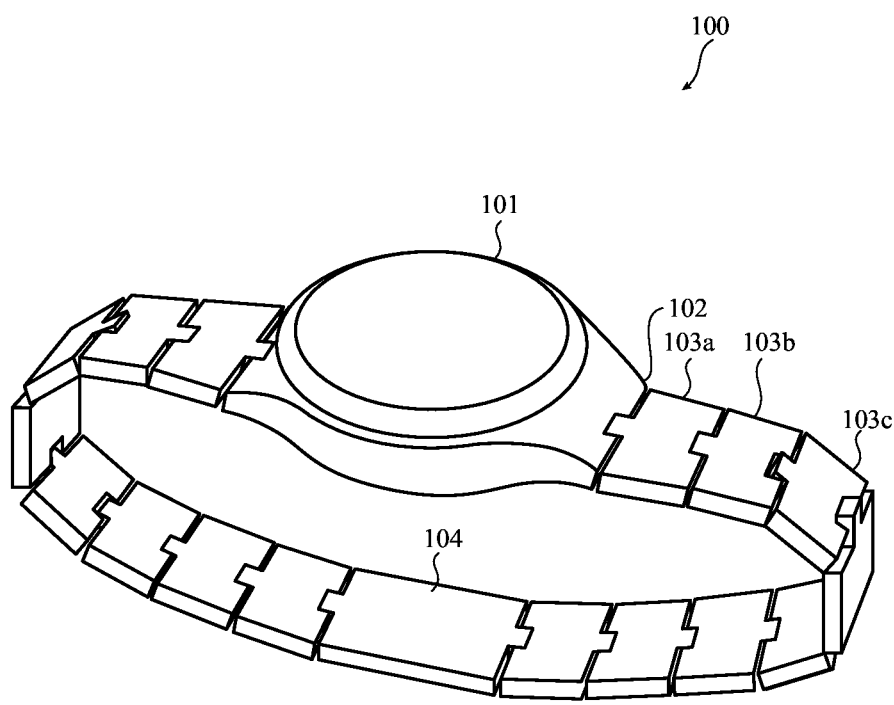
FIG. 1 is an isometric view of an example system including a wearable device and a band including multiple links.

The description that follows includes sample systems, methods, and apparatuses that embody various elements of the present disclosure. However, it should be understood that the described disclosure may be practiced in a variety of forms in addition to those described herein.

The present disclosure details systems, apparatuses, and methods related to modular functional band links for wearable devices. A wearable device may be electrically and mechanically coupled to a band including multiple modular functional band links. Each of the modular functional band links may be electrically and mechanically connected to one or more other of the modular functional band links and/or the wearable device. Further, each of the modular functional band links may include one or more electronic components.

In various implementations, the wearable device may receive identifiers from each of the modular functional band links (such as serial numbers and/or other identifiers including information specifying the electronic component included, specifying functionality available, uniquely identifying the respective modular functional band link or electronic component, and so on), determine functionality available via the modular functional band links using the identifiers, and communicate with one or more of the modular functional band links to utilize the determine functionality. Such communication may utilize the identifiers to address the communications.

In some implementations, the modular functional band links may include multiple different output devices such as vibrators or other haptic devices. In such implementations, the wearable device may determine to provide an output pattern and signal the respective output devices according to the output pattern.

In various implementations, the modular functional band links may include multiple different input devices such as touch pads, switches, buttons, force sensors, or touch screens. In such implementations, the wearable device may receive input indications from the input devices and perform one or more actions based on a pattern in which the input indications were detected by the respective input devices.

The modular functional band links may be connected to one or more of each other and/or the wearable device in a variety of sequences. Such sequences may include sequences that omit one or of the modular functional band links, sequences that include additional modular functional band links, and/or sequences that include one or more modular band links that do not include an electronic component.

The electrical connection between modular functional band links and/or the wearable device may include one or more ground connections, power connections, and/or communication connections. In various implementations, the electrical connection may include flexible conductors that maintain contact with conductive portions (which may be separated by nonconductive portions) of a pin regardless of rotation of the pin. In some implementations, one or more fiber optic connections may communicably couple modular functional band links and/or the wearable device.

The electronic components included in the modular functional band links may be any kind of electronic component associated with any kind of functionality. Such electronic components may include one or more batteries, input devices, output devices, haptic devices, displays, sensors, actuators, processors, electricity generators, photovoltaic cells, cameras, photo sensors, indicators, accelerometers, speedometers, compasses, gyroscopes, global positioning systems, thermometers, hygrometers, blood pressure sensors, sweat sensors, magnetic field sensors, antennas (such as a WiFi antenna, a Bluetooth antenna, a cellular antenna, a near field communication antenna, and so on), vibrators, speakers, track wheels, track balls, touch sensors, buttons, sliders, force sensors, and/or any other electronic component.

In various implementations, the modular functional band links may include a number of batteries connected in serial and/or in parallel. The batteries may be chargeable by coupling the wearable device to a power source (such as via induction) and/or by disconnecting one or more of the modular functional band links and connecting them to a power adapter that is operable to couple to the power source.

Figure 2:
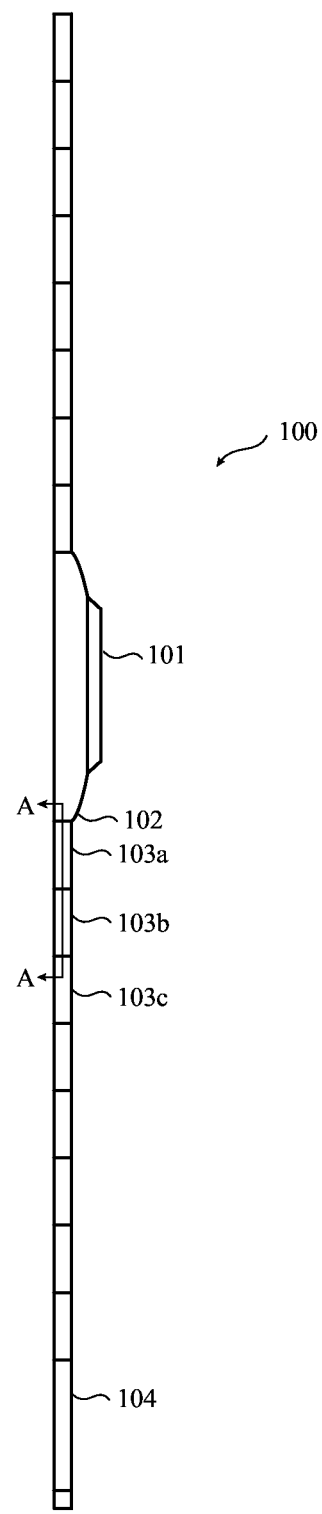
FIG. 2 is a side view of the example system of FIG. 1 after the clasp of the band has been decoupled and the band laid flat.

FIG. 1 is an isometric view of an example system 100 including a wearable device 101 and a band including multiple links (such as links formed of metal, plastic, rubber, and/or other materials) to which the wearable device is mechanically and/or electrically coupled, such as modular functional band links 103a-103c. FIG. 2 is a side view of the example system 100 of FIG. 1 after a clasp 104 of the band has been decoupled and the band laid flat.

As illustrated, the wearable device 101 is shown as a digital watch with a band. However, it is understood that this is an example and that the wearable device may be any kind of electronic device (such as a digital media player, a smart phone, a tablet computer, and/or other electronic device) and/or connect to any kind of attachment structure (such as a strap, clasp, and/or other attachment structure) without departing from the scope of the present disclosure.

The wearable device 101 may include one or more components (not shown) that provide one or more of a variety of different functionalities. Such components may include one or more processing units, one or more input/output components, one or more communication components, and one or more non-transitory storage media (which may take the form of, but is not limited to, a magnetic storage medium; optical storage medium; magneto-optical storage medium; read only memory; random access memory; erasable programmable memory; flash memory; and so on). Multiple links of the band, such as modular functional band links 103a-103c, may include one or more electronic components and may be electrically and mechanically, and/or communicably, connected to one or more other links and/or the wearable device.

Multiple links of the band such as modular functional band links 103a-103c may include one or more electronic components. Such electronic components may include one or more batteries, input devices, output devices, haptic devices, displays, sensors, actuators, processors, electricity generators, photovoltaic cells, cameras, photo sensors, indicators, accelerometers, speedometers, compasses, gyroscopes, global positioning systems, thermometers, hygrometers, blood pressure sensors, sweat sensors, magnetic field sensors, antennas (such as a WiFi antenna, a Bluetooth antenna, a cellular antenna, a near field communication antenna, and so on), vibrators, speakers, track wheels, track balls, touch sensors, buttons, sliders, force sensors, and/or any other electronic component.

The wearable device 101 may receive identifiers from modular functional band links, such as the modular functional band links 103a-103c. In some cases, the modular functional band links may transmit such an identifier upon connection, upon a request for an identifier, or in response to other events. Such an identifier may be a serial number and/or other identifier including information specifying the electronic component included, specifying functionality available, uniquely identifying the respective modular functional band link or electronic component, and so on. For example, a modular functional band link that includes a battery may provide a serial number where some of the digits specify that the modular functional band link includes a battery and some other digits constitute a unique identifier for that specific modular functional band link. However, is it understood that this is an example and that other implementations are possible without departing from the scope of the present disclosure.

The wearable device 101 may analyze received identifiers to determine one or more functionalities available via modular functional band links. In some implementations, the wearable device may store information in a database or other data structure regarding functionality determined to be available, identifiers associated with such functionality, position of modular functional band links in the band (e.g., the sequence of the links in the band) determined based on the received identifiers and/or other communications with modular functional band links, and/or other such information. One or more of the modular functional band links may also communicate with another or multiple band links, such as where a modular functional band link passes an identifier received from a previous modular functional band link to the wearable device and/or to a subsequent modular functional band link. In such cases, one or more of the modular functional band links may also store such information.

The wearable device 101 may communicate with one of the modular functional band links to utilize or realize the determined functionality. In some embodiments, such communication may use the received identifiers for addressing communication.

For example, audio output may be part of operation of the wearable device 101. The wearable device may receive an identifier that indicates that the modular functional band link 103c includes a speaker. The wearable device may instruct the speaker in the link to play audio through a communication bus, which may be shared with all modular functional band links. The instruction may be marked with or include the identifier for the modular functional band link 103c. As such, other modular functional band links may ignore the message while the modular functional band link 103c may process the message and play the instructed audio. However, it is understood that this is an example and that modular functional band links and/or the wearable device may communicate in a variety of different ways (synchronously, asynchronously, in serial, in parallel, one way communication, two way communication, wired, wirelessly, and so on) in a variety of different network topologies (such as a bus topology, a shared bus topology, a token topology, and so on) and configurations (such as a master/multiple slave relationship and so on) without departing from the scope of the present disclosure.

By way of another example, the modular functional band links may include multiple different output devices such as vibrators or other haptic devices. The wearable device 101 may provide an output pattern and signal the respective output devices according to the output pattern utilizing the received identifiers. For example, a pattern of vibrations produced by modular functional bands in a first sequence (such as circularly in a first direction around the band) may correspond to a user set alarm whereas a pattern of vibrations produced by the modular functional bands in a second sequence (such as circularly in a second direction around the band) may indicate that battery power has dropped below an alert threshold.

In some implementations, one or more modular functional band links, such as the modular functional band links 103a-103c, may communicate with one or more other links and/or the wearable device upon detection of an event or in response to other occurrences. For example a modular functional band link that includes an input device may initiate communication upon receiving input.

In various implementations, separate modular functional band links may work in combination. For example, modular functional band links that include batteries and light emitting diodes (LEDs) may illustrate total power remaining among all batteries by the number of LEDs lit. By way of another example, camera and microphone included in separate modular functional band links that cooperate to record video.

In some implementations, modular functional band links may include multiple different input devices such as touch pads, switches, buttons, force sensors, or touch screens. The wearable device 101 may receive input indications from the input devices and perform one or more actions based on a pattern in which the input indications were detected by the respective input devices. For example, touching a sequence of touch pads in a first direction (such as circularly in a first direction around the band) may cause the wearable device to transition to a "power off" state whereas touching a sequence of touch pads in a second direction (such as circularly in a second direction around the band) may cause the wearable device to transition to a power saving or "sleep" state.

As the band links are modular, they may be connected to one or more of each other and/or the wearable device in a variety of sequences. Such sequences may include sequences that omit one or of the modular functional band links, sequences that include additional modular functional band links, and/or sequences that include one or more modular band links that do not include an electronic component. In some implementations, modular band links that do not include an electronic component may include non-functional components such as ornaments (such as jewels and/or other decorations), bells, reflectors, photo frames, loupes, and so on. In various implementations, modular band links that do not include an electronic component may still function to electrically connect modular functional band links and/or the wearable device 101.

Figure 3A:
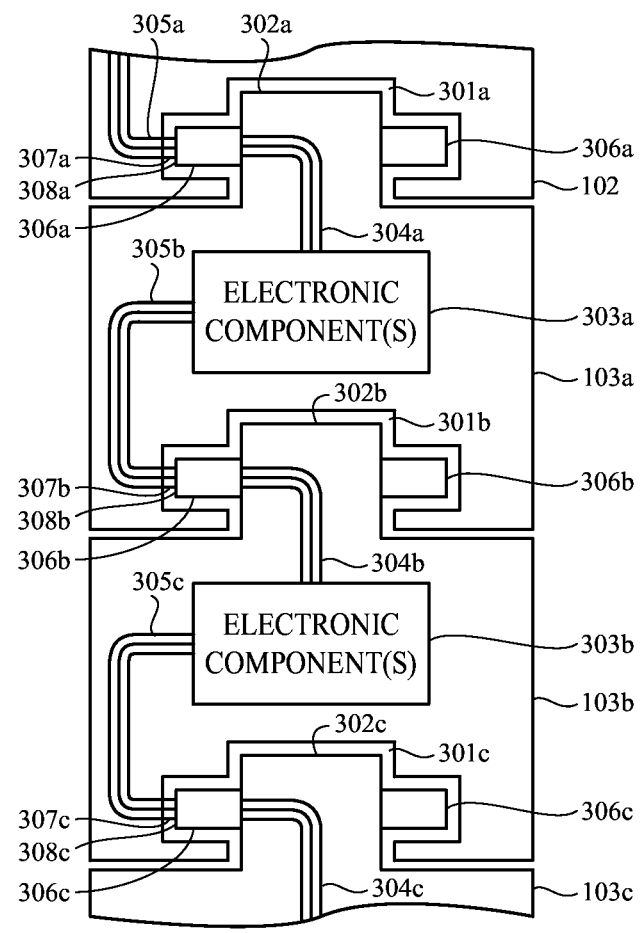
FIG. 3A is a cross sectional schematic view of portions of the wearable device and band links of FIG. 2, taken along the line A-A of FIG. 2, in accordance with a first example implementation.

FIG. 3A is a cross sectional schematic view of portions of the wearable device 101 and band links 103a-103c of FIG. 2, taken along the line A-A of FIG. 2, in accordance with a first example implementation. As illustrated, an interface 102 of the wearable device 101 may be mechanically and electrically coupled to the modular functional band link 103a utilizing a pin 306a that includes conductive portions separated by insulating and/or nonconductive portions (see FIG. 4A). As also illustrated, the modular functional band link 103a may be mechanically and electrically coupled to the modular functional band link 103b utilizing a pin 306b and the modular functional band link 103b may be mechanically and electrically coupled to the modular functional band link 103c utilizing a pin 306c.

The interface 102 may include a groove 301a into which a tongue 302a of the modular functional band link 103a (including the pin 306a) fits. Similarly, the modular functional band link 103a may include a groove 301b into which a tongue 302b of the modular functional band link 103b fits and the modular functional band link 103b may include a groove 301c into which a tongue 302c of the modular functional band link 103c fits. One or more of the pins 306a-306c may be spring pins or similar mechanisms to aid in decoupling/coupling the interface 102 and/or the modular functional band links 103a-c.

Figure 4A:
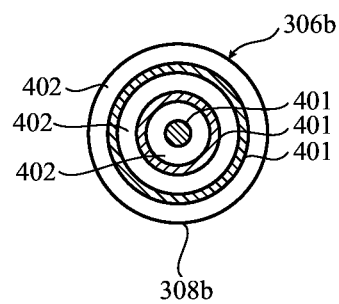
FIG. 4A is a left side view of the pin of FIG. 3 with other components removed for clarity.

As illustrated, each of the modular functional band links 103a-c are shown including conductive components 304a-c (such as wires) that connect to respective conductive portions of the respective pins 306a-c (see FIG. 4A). As also illustrated, each of the modular functional band links 103a-b and the interface 102 are shown including conductive components 305a-c (such as wires) that connect to respective conductive portions of the respective pins 306a-c via respective flexible conductive material 307a-c that extends from the modular functional band links 103a-b and the interface 102, respectively, to a respective surface 308a-c of the respective pin 306a-c. The modular functional band links 103a and 103b are also illustrated as including electronic component(s) 303a-b, which are respectively connected to conductive components 304a-b and 305b-c.

In some embodiments, the respective surface 308a-c may be a flat circular surface that includes multiple circular, concentric conductive portions separated by nonconductive portions. Each flexible conductive material 307a-c may contact but not mechanically couple to the respective surface 308a-c, instead wiping the surface to maintain the respective electrical connection. One or more of the interface 102, the modular functional band links 103a-c, and/or the pins 306a-c may rotate and/or otherwise move with respect to each other. However, the conductive portions of the pins 306a-c and/or the flexible conductive material 307a-c may be configured such that the respective flexible conductive material moves along the respective conductive portions of the pins during such rotation or movement, thereby allowing an electrical connection to be maintained despite the rotation or movement. Such a configuration may also enable electrical connection of the wearable device 101 and/or the modular functional band links 103a-c without exposure of electrical contact elements to corrosion and/or the external environment.

FIG. 4A is a left side view of the pin 306b of FIG. 3A with other components removed for clarity. As illustrated, the pin 306b includes multiple circular, concentric conductive portions 401 separated by multiple insulating and/or nonconductive portions 402 exposed on the flat circular surface 308b that is contacted by the flexible conductive material 307b. The circular, concentric conductive portions (and/or the insulating and/or nonconductive portions) may extend through the pin from the end surface 308b to the opposing end surface in order to contact the conductive components 304b. In this way, multiple electrical connections may be supported by a single pin. Such electrical connections may include one or more ground connections, power connections, communication connections, and so on.

Figure 4B:
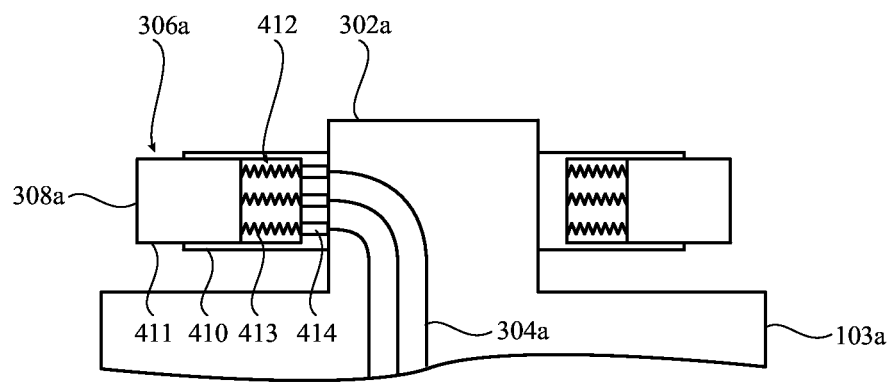
FIG. 4B is a close up view of a first example implementation of how the conductive portions of the pin may be connected to the band links of FIG. 3A with other components removed for clarity.

FIG. 4B is a close up view of a first example implementation of how the conductive portions 401 of the pin 306a may be connected to the band link 103a of FIG. 3A with other components removed for clarity. As illustrated, the pin 306a may include a moveable pin 411 and a collar 412. The collar may include a cavity 412 into which the moveable pin may be forced. However, springs 413 bias the moveable pin against force pushing the moveable pin into the cavity such that the moveable pin at least partially projects from the collar in the absence of force. Further, the springs 413 may conductively connect the respective conductive portions 401 of the pin 306a to contacts 414 of the collar. These contacts may be coupled to the conductive components 304a of the band link.

Figure 4C:
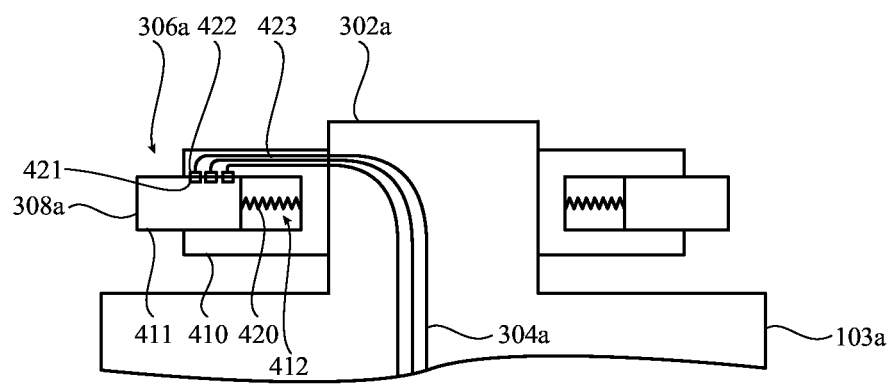
FIG. 4C is a close up view of a second example implementation of how the conductive portions of the pin may be connected to the band links of FIG. 3A with other components removed for clarity.

FIG. 4C is a close up view of a second example implementation of how the conductive portions 401 of the pin 306a may be connected to the band link 103a of FIG. 3A with other components removed for clarity. Similar to FIG. 4B, the pin 306a may include a moveable pin 411 and a collar 412 including a cavity 412 into which the moveable pin may be forced, against which the spring 420 biases the moveable pin. However, in this implementation the pin 306a may include conductive portions 421 around the circumference of the outer curved middle surface that connect to the conductive portions 401 of the flat circular end surface 308a within the pin 306a. Further, the collar may include contacts 422 connected to the conductive components 304a of the band link 103a via connection lines 423. When the moveable pin at least partially projects from the collar in the absence of force, the contacts 421 may connect with the contacts 422, connecting the conductive portions 401 of the flat circular end surface 308a of the pin 306a to the conductive components 304a of the band link 103a.

Although FIGS. 3-4 illustrate particular connection configurations utilizing the pins 306a-306c, it is understood that this is an example. Various other configurations are possible and contemplated without departing from the scope of the present disclosure.

For example, the pins 306a-306c are shown as two part pins mounted to the respective tongues 302a-302b. However, in various implementations the pins may be a single piece that extends through the respective tongue. In such an implementation, the conductive portions may extend from the end surface 308a-c to a differently oriented surface of the respective pin instead of the opposing end surface, such as the outer curved middle surface as opposed to an end surface, and the conductive components 304a-c may connect to flexible conductive portions 307a-c that move along the conductive portions of the wide surface of the respective pin.

By way of another example, the pins 306a-c are described and/or shown as having three conductive portions 401 contacted respectively by three conductive components 304a-c and 305a-c. However, other numbers of conductive portions and/or conductive components (such as two or four) are possible and contemplated without departing from the scope of the present disclosure.

In yet another example, one or more of the modular functional band links and/or the interface 102 may be communicably coupled using an optical communication medium and/or other communication medium instead (and/or in addition to) of an electrical connection without departing from the scope of the present disclosure. For example, in some implementations the groove 302b may include a first fiber optic connector and the center conductive portion 401 shown in FIG. 4A may be replaced with a second fiber optic connector. In such an implementation, communication may be performed via the first and second fiber optic connectors. In various implementations, a unified fiber optic connection may extend from the wearable device 101 throughout the entire band, from the wearable device through a portion of the band, through the entire band, and/or through a portion of the band. In still other implementations, the wearable device and/or one or more of the modular functional band links may communicate wirelessly, such as via WiFi, Bluetooth, near field communication, and/or other wireless technology.

In still another example, in some cases the respective conductive components 305a-c may electrically connect to the conductive portions of the respective pin 306a-c without utilizing the flexible conductive portions 307a-c. In such implementations, the respective conductive components 305a-c may couple to the conductive portions of the respective pin 306a-c utilizing one or more flex circuits, directly contact, and/or otherwise electrically connect without departing from the scope of the present disclosure.

In yet another example, though FIG. 3A is illustrated and described as mechanically and electrically connecting the wearable device 101 and the band links 103a-c via a path using the illustrated left component of the two part pins 306a-c, it is understood that this is an example and that other configurations are possible without departing from the scope of the present disclosure.

Figure 3B:
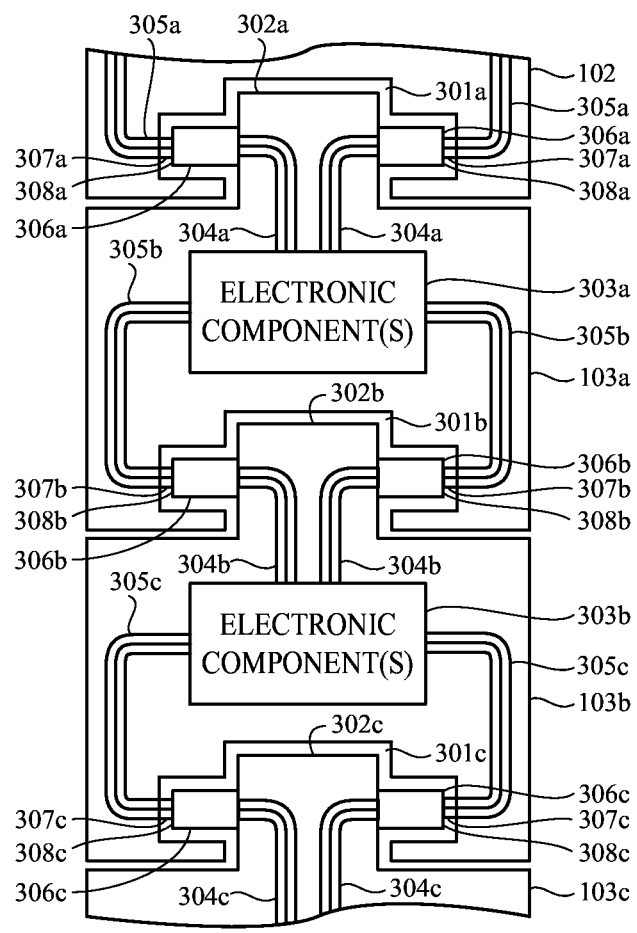
FIG. 3B is a first alternative implementation to the view show in FIG. 3A.

By way of illustration, FIG. 3B illustrates a first alternative example where such path is configured using both the illustrated right and left components of the two part pins 306a-c. Such an implementation may provide additional electrical and/or communication pathways over that illustrated in FIG. 3A. In some examples, the left path may be used for power connection whereas the right path may be used for communication connection, though it is understood that this is an example.

Figure 3C:
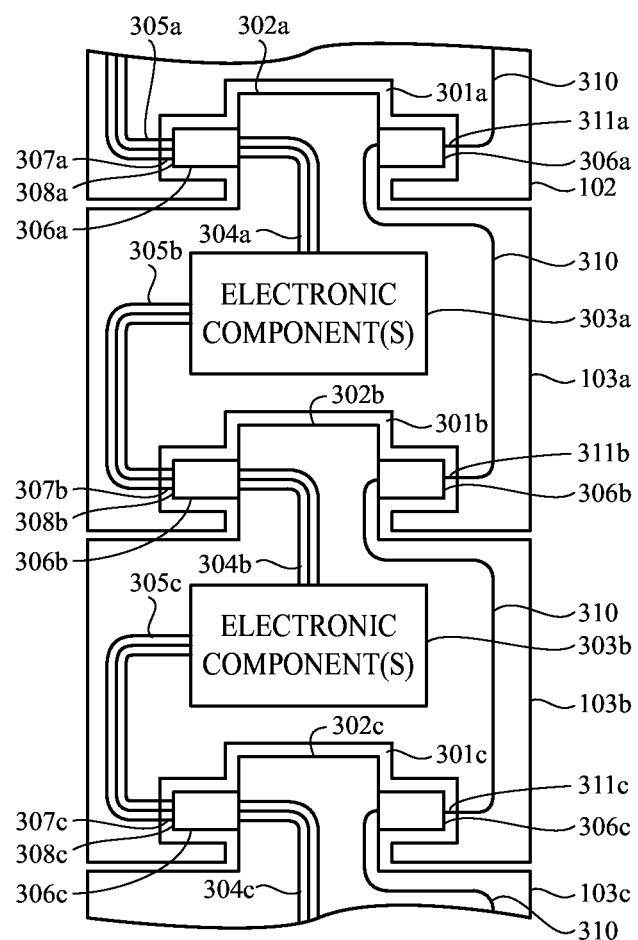
FIG. 3C is a second alternative implementation to the view show in FIG. 3A.

By way of another illustration, FIG. 3C illustrates a second alternative example where a common ground line 310 runs through the wearable device 101 and the band links 103a-c using the illustrated right components of the two part pins 306a-c. As illustrated, the respective common ground line in a band link may connect to that of the previous band link or the wearable device via respective flexible conductive material 311a-c extending from the respective pin 306a-c.

Figure 5A:
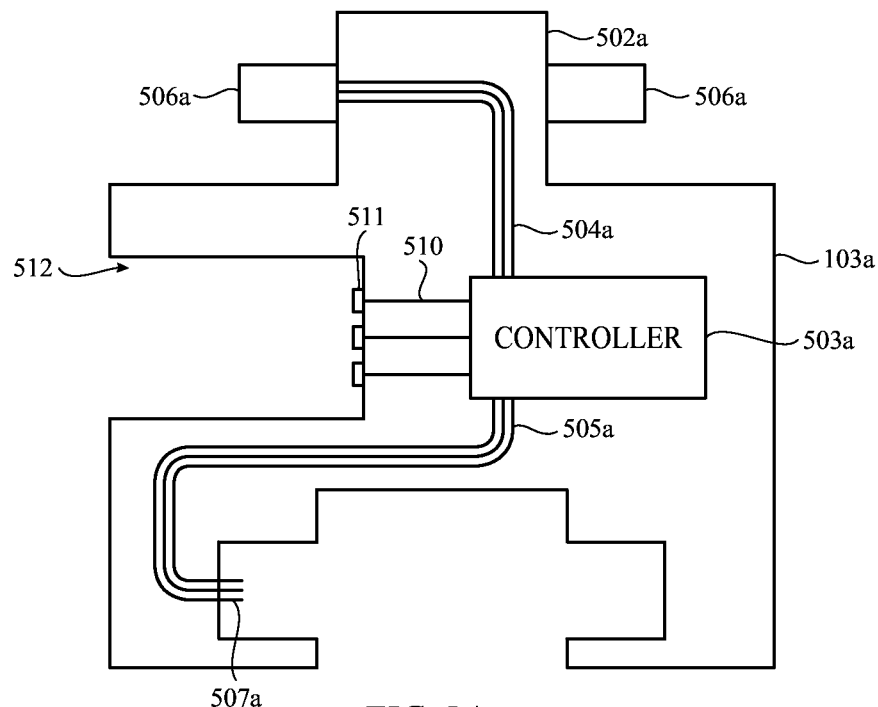
FIG. 5A illustrates an embodiment of a band link that is an alternative to that shown in FIG. 3A.

FIG. 5A illustrates an embodiment of a band link 103a that is an alternative to that shown in FIG. 3A. By way of contrast, the band link 103a includes a controller 503a electrically coupled to the conductive components 504a and 505a instead of an electrical component. The controller is electrically connected to contacts 511 in a slot 512 by conductive components 510. Electrical component modules may be inserted into the slot to electrically, mechanically, and or communicably couple to the band link 103a such that different electrical components may be utilized with the band link 103.

Figure 5B:
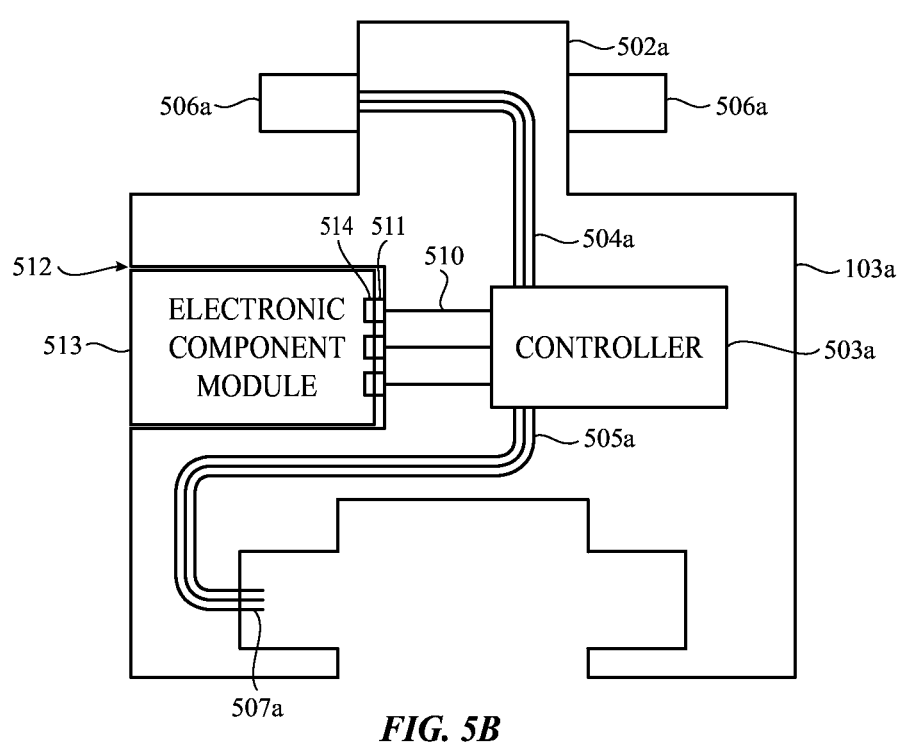
FIG. 5B illustrates the band link of FIG. 5B after insertion of an electronic component module.

FIG. 5B illustrates the band link 103a of FIG. 5B after insertion of an electronic component module 513. As shown, the electrical component module may include contacts 514 that contact the contacts 511 when the electrical component module is inserted into the slot 512, connecting to other modular functional band links and/or the wearable device 101 via the controller 503a.

Although FIGS. 5A-5B illustrate a particular configuration, it is understood that that this is an example. Other configurations are possible and contemplated without departing from the scope of the present disclosure.

For example, in various implementations the band link 103a may not include the slot 512. Instead, an outer surface (such as the top surface) may include an electrical and/or mechanical connection to which an electronic component module 513 may be coupled. Such coupling may electrically connect the electronic component module to the controller 503a. In various implementations such a configuration may be used with a solid band instead of a band made up of links.

By way of another example, in various implementations the band link 103a may include a center gap with side rail contacts instead of the slot 512. In such an implementation, the electronic component module may be inserted into the center gap of the band link 103a itself instead of inserted into a slot in the side.

In various implementations, such a configuration may be used with a solid band instead of a band made up of links, such as a solid band made up of two parallel rails into which electronic components may be inserted. In such an implementation, portions of the parallel rails other than those where the electrical components may be inserted (which may be conductive material such as metal, conductive rubber, and so on) may be insulated by nonconductive and/or other insulating material.

Figure 6:
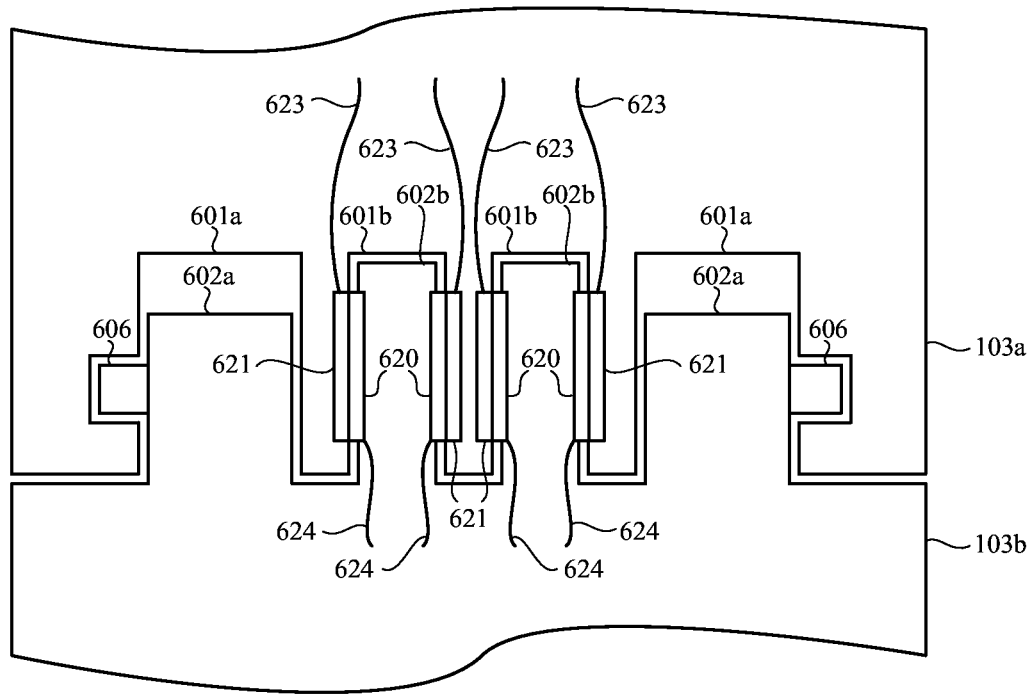
FIG. 6 illustrates an embodiment of a band link connection that is an alternative to that shown in FIG. 3A.

FIG. 6 illustrates an embodiment of a band link connection that is an alternative to that shown in FIG. 3A. By way of contrast, the modular functional band link 103a may be mechanically coupled to the modular functional band link 103b by a first set of tongues 602a (that include pins 606) and grooves 601a. Further, the modular functional band link 103a may be electrically coupled to the modular functional band link 103b by a second set of tongues 602b and grooves 601b that include contacts 620 and 621, which are in turn respectively electrically coupled to conductive components 623 and 624.

Although FIG. 6 illustrates a particular configuration, it is understood that that this is an example. Other configurations are possible and contemplated without departing from the scope of the present disclosure.

For example, in various implementations a single set of tongues and grooves that includes the pins 606 and the contacts 620 and 621 may be utilized instead of the first and second set of tongues and grooves 602a-b and 601a-b. In some instances of such an implementation, the pins may not extend through the contacts, may extend through but may be electrically insulated from the contacts, and so on. Various configurations are possible and contemplated.

Figure 7:
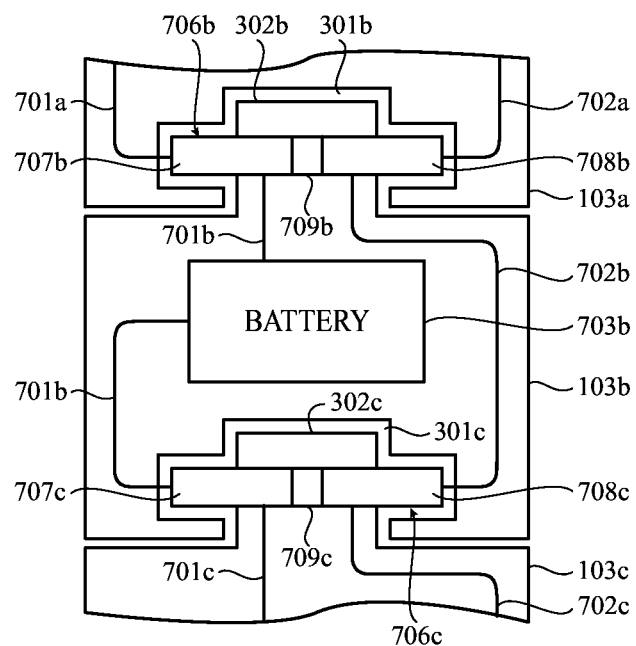
FIG. 7 illustrates an embodiment of band links that are an alternative to those shown in FIG. 3A.

FIG. 7 illustrates an embodiment of band links 103a-103c that are an alternative to those shown in FIG. 3A. By way of contrast, in such an embodiment multiple modular functional band links, such as the modular functional band links 103a-c, may include a number of batteries. Though FIG. 7 shows only modular functional band link 103b as including a battery 703b for the sake of clarity, it is understood that other modular functional band links, such as the modular functional band links 103a and 103c, may include batteries.

As shown, each of the modular functional band links 103a-c may include respective power connection lines 701a-c and 702a-c that connect from the pin 706b-c of the respective modular functional band link to the pin of the previous modular functional band link. Each pin may include respective conductive sections 707b-c and 708b-c that are separated by nonconductive section 709b-c. As illustrated, the power connection lines 701a-c connect to the conductive sections 707b-c and the respective power connection lines 702a-c connect to the conductive sections 708b-c. As the conductive sections 707b-c and 708b-c are separated by the nonconductive section 709b-c, the pins 706*b-c* may be able to electrically connect the respective power connection lines 701*a-c* and 702*a-c* of the modular functional band links 103*a-c* via a single respective pin without shorting the power connection lines.

As illustrated, the battery 703*b* may be connected to the power connection line 701*b* in this embodiment. For example, a positive terminal of the battery may be connected to the portion of the power connection line 701*b* connected to the conductive section 707*b* and a negative terminal of the battery may be connected to the portion of the power connection line 701*b* connected to the conductive section 707*c*. In such an example, the positive and negative orientation of batteries included in the modular functional band links 103*a* and 103*c* may be reversed such that the batteries are connected in series.

The power connection line 702*a-c* may carry current fed back from the last of the modular functional bank links including one of the batteries connected in the series, or a termination link. Such a termination link may be configured in a variety of ways.

For example, instead of connecting the power connection lines of the terminal link to conductive portions of the pin of a next link, the power connection lines may be connected. In some cases, the termination may be accomplished by a switch connecting the power connection lines when a sensor detects that a subsequent modular functional bank links including a battery for the series is not connected.

By way of another example, instead of a pin with conductive portions separated by nonconductive portions, a termination link may include conductive portions that connect the power connection lines.

Although a particular battery connection configuration is illustrated and described with respect to FIG. 7, it is understood that this is an example. In various implementations, other configurations may be utilized without departing from the scope of the present disclosure. In some implementations, such batteries may be connected in parallel, a combination of series and parallel, and so on.

For example, in an implementation where the batteries are connected in parallel, the battery 703*b* may not be directly coupled to the power connection line 701*b*. Instead, the power connection line 701*b* may directly connect the conductive sections 707*b* and 707*c* and positive and negative terminals of the battery may be separately connected respectively to the conductive sections 707*b* and 708*b* by respective conductors.

By way of another example, in some implementations a terminal link may not be utilized. Instead, modular functional band links including batteries connected in series may lead all the way around the band and the series may electrically connect to the wearable device 101 at both ends of the band.

Additionally, in various implementations such battery arrangements may be used with bands that are not formed of links. For example, such battery arrangements may be case or sewn in place in flexible band materials such as cloth, leather, rubber, and so on. Such flexible bands may be single piece bands, two piece bands, and/or other configurations without departing from the scope of the present disclosure.

In various implementations, batteries of a battery arrangement like that shown in FIG. 7 may be chargeable by coupling the wearable device 101 to a power source, such as by inductively coupling the wearable device to an inductive power charging dock. In some implementations, the modular functional band links may be disconnected from the wearable device and connected to a power adapter that may also be coupled to the power source but may not include all of the components of the wearable device. For example, a wearable device may be utilized with multiple bands that each include a number of batteries. In such an example, one band may be utilized with the wearable device while another is connected to the power adapter for charging of the batteries.

Figure 8:
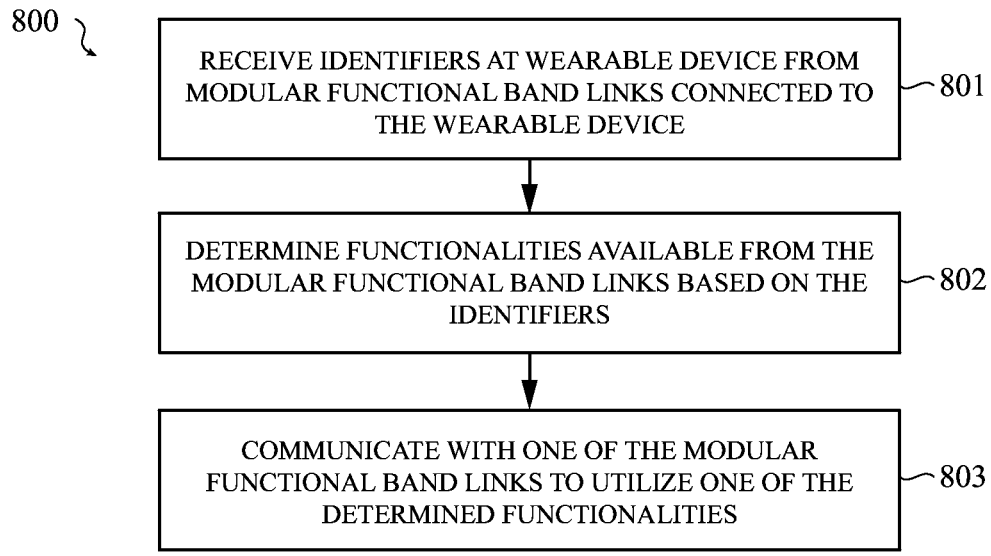
FIG. 8 is a method diagram illustrating a first example method for utilizing functional components of band system for a wearable device. This method may be performed by the systems of FIGS. 1-7.

FIG. 8 is a method diagram illustrating a first example method 800 for utilizing functional components of band system for a wearable device. This method may be performed by the systems of FIGS. 1-7.

The flow may begin at block 801 where identifiers are received at a wearable device from modular functional band links connected to the wearable device. The flow may then proceed to block 802 where the wearable device determines one or more functionalities available from the modular functional band links based on the identifiers.

At block 803, the wearable device may communicate with one or more of the modular functional band links to utilize the determined functionality. Such communication may utilize a received identifier for addressing.

Although the method 800 is illustrated and described above as including particular operations performed in a particular order, it is understood that this is an example. In various implementations, various orders of the same, similar, and/or different operations may be performed without departing from the scope of the present disclosure.

For example, block 803 is illustrated and described above as the wearable device as communicating with one or more of the modular functional band links. However, in some implementations the wearable device may perform an additional operation of determining to communicate with the modular functional band link. Such a determination may be performed in response to the occurrence of one or more events that indicate to perform one or more functions associated with the determined functionality, such as the reaching of a particular time indicating to provide a notification related to an alarm associated with the particular time. In still other implementations, one or more of the modular functional band links may initiate communication. Such communication may be initiated with the wearable device and/or one or more other modular functional band links.

Figure 9:
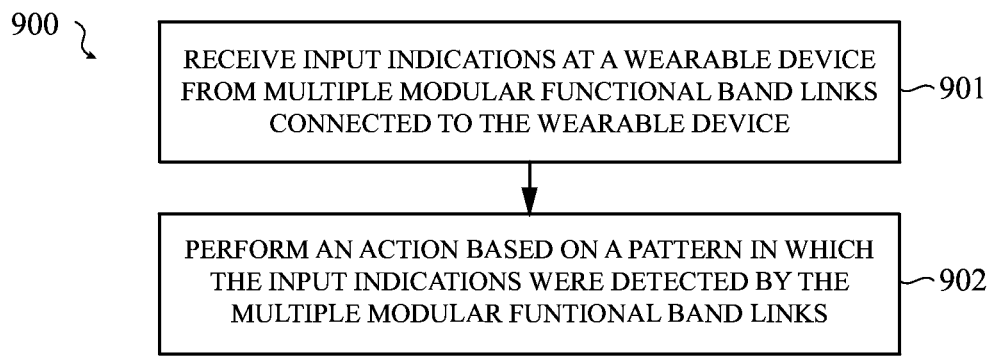
FIG. 9 is a method diagram illustrating a second example method for utilizing functional components of band system for a wearable device. This method may be performed by the systems of FIGS. 1-7.

FIG. 9 is a method diagram illustrating a second example method 900 for utilizing functional components of band system for a wearable device. This method may be performed by the systems of FIGS. 1-7.

The flow may begin at block 901 where input indications are received at a wearable device from multiple modular functional band links that each include an input component and are connected to the wearable device. The flow may then proceed to block 902 where the wearable device performs an action based on a pattern in which the input indications were detected by the multiple modular functional band links.

Although the method 900 is illustrated and described above as including particular operations performed in a particular order, it is understood that this is an example. In various implementations, various orders of the same, similar, and/or different operations may be performed without departing from the scope of the present disclosure.

For example, block 901 is illustrated and described above as receiving multiple input indications. However, in various implementations multiple input indication receiving steps may be performed that each receive a single input indication. Alternatively, in some implementations a single message may be received indicating that multiple modular functional band links detected input, such as in implementations where communications are passed from link to link in the band and input indications from previous links are combined into a single message to pass toward the wearable device.

Figure 10:
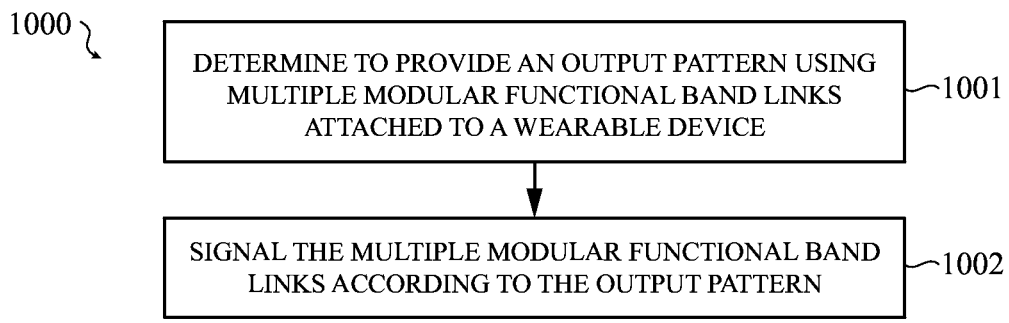
FIG. 10 is a method diagram illustrating a third example method for utilizing functional components of band system for a wearable device. This method may be performed by the systems of FIGS. 1-7.

FIG. 10 is a method diagram illustrating a third example method 1000 for utilizing functional components of band system for a wearable device. This method may be performed by the systems of FIGS. 1-7.

The flow may begin at block 1001 where a wearable device determines to provide an output pattern using multiple modular functional band links that each include an output component and are attached to the wearable device. The flow may then proceed to block 1002 where the wearable device signals the multiple modular functional band links to provide output according to the output pattern.

Although the method 1000 is illustrated and described above as including particular operations performed in a particular order, it is understood that this is an example. In various implementations, various orders of the same, similar, and/or different operations may be performed without departing from the scope of the present disclosure.

For example, in some implementations the wearable device may include one or more output components and the output pattern may include providing output via the output component of the wearable device in addition to those of one or more of the modular functional band links. In such an implementation, the wearable device may perform an operation of providing output via the output component of the wearable device in addition to signaling and/or otherwise communicating with the multiple modular functional band links to provide output according to the output pattern.

As discussed above and illustrated in the accompanying figures, the present disclosure details systems, apparatuses, and methods related to modular functional band links for wearable devices. A wearable device may be electrically and mechanically coupled to a band including multiple modular functional band links that are each electrically and mechanically connected to one or more other of the modular functional band links and/or the wearable device. Each of the modular functional band links may include one or more electronic components.

In various implementations, the wearable device may receive identifiers from each of the modular functional band links, determine functionality available using the identifiers, and communicate with one or more of the modular functional band links to utilize the determine functionality. In some implementations, the modular functional band links may include multiple different output devices and the wearable device may determine to provide an output pattern and signal the respective output devices according to the output pattern. In various implementations, the modular functional band links may include multiple different input devices and the wearable device may receive input indications from the input devices and perform an action based on a pattern in which the input indications were detected by the respective input devices.

In the present disclosure, the methods disclosed may be implemented utilizing sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

Techniques included in the described disclosure may utilize a computer program product, or software, that may include a non-transitory machine-readable medium having stored thereon instructions, which may be used to program a computer system (or other electronic devices) to perform a process and/or construct devices according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A band system, comprising:
   a wearable device; and
   multiple modular functional band links, each comprising:
      an electronic component; and
      a pin operative to electrically and mechanically connect its modular functional band link to at least one of the wearable device or another of the multiple modular functional band links; the pin comprising
         a first conductive portion;
         a second conductive portion; and
         a nonconductive portion separating the first and second conductive portions;
   wherein the pin maintains its electrical connection during rotation of its modular functional band link;
   wherein the wearable device:
      receives identifiers from each of the multiple modular functional band links;
      determines functionality available via the multiple modular functional band links utilizing the received identifiers; and
      communicates with one of the multiple modular functional band links to utilize the determined functionality.

2. The band system of claim 1, wherein the electronic component comprises at least one of a battery, an input device, an output device, a haptic device, a display, a sensor, an actuator, a processor, an electricity generator, a photovoltaic cell, a camera, a photo sensor, an indicator, an accelerometer, a speedometer, a compass, a gyroscope, a global positioning system, a thermometer, a hygrometer, a blood pressure sensor, a sweat sensor, a magnetic field sensor, an antenna, a vibrator, a speaker, a track wheel, a track ball, a touch sensor, a button, a slider, or a force sensor.

3. The band system of claim 1, wherein the identifiers each include information specifying the electronic component included in the respective modular functional band link and uniquely identifying the respective modular functional band link.

4. The band system of claim 1, wherein the wearable device uses the identifiers to address communications to the multiple modular functional band links.

5. The band system of claim 1, wherein the electrical connection comprises at least one of a power connection, a ground connection, or a communication connection.

6. The band system of claim 1, wherein the other modular functional band link electrically connects to the pin via flexible conductive material extending from the first of the modular functional band links.

7. The band system of claim 6, wherein the pin is rotatable with respect to the other modular functional band links and the flexible conductive material remains electrically connected to the pin despite the rotation.

8. The band system of claim 1, wherein a first of the modular functional band links is communicably connected to at least one of a second of the modular functional band links or the wearable device via a fiber optic connection.

9. The band system of claim 1, wherein:
the multiple modular functional band links include multiple input components; and
the wearable device receives input indications from the multiple input components and performs an action based on a pattern in which the input indications were detected by the respective multiple input components.

10. The band system of claim 1, wherein:
the multiple modular functional band links include multiple output components; and
the wearable device determines to provide an output pattern using the multiple output components and signals the multiple output components according to the pattern.

11. The band system of claim 1, wherein the multiple modular functional band links are configured to be:
connected in multiple sequences;
connected omitting one of the multiple modular functional band links; or
connected utilizing an additional modular functional band link.

12. The band system of claim 1, wherein the multiple modular functional band links include multiple batteries that are connected in at least one of series or parallel.

13. The band system of claim 12, wherein the multiple batteries are chargeable by coupling the wearable device to a power source.

14. The band system of claim 13, wherein the multiple modular functional band links are configured to be disconnected from the wearable device and connected to a power adapter that is operable to charge the multiple batteries by coupling to the power source.

15. The band system of claim 1, further comprising at least one modular band link without an electronic component that is mechanically connect to at least one of the wearable device or one of the multiple modular functional band links.

16. The band system of claim 15, at least one modular band link electrically connects at least one of two of the multiple modular functional band links or one of the multiple modular functional band links and the wearable device.

17. A band system for a wearable device, comprising:
a wearable device; and
multiple modular functional band links that electrically and mechanically connect to at least one of the wearable device or another of the multiple modular functional band links;
wherein:
the multiple modular functional band links each include an input component and the wearable device receives input indications from the multiple modular functional band links and performs an action based on a pattern in which the input indications were detected by the respective modular functional band links; or
the multiple modular functional band links each include an output component and the wearable device determines to provide an output pattern using the multiple modular functional band links and signals the multiple modular functional band links according to the pattern.

18. A band for a wearable device, comprising:
multiple modular functional band links that each include an electronic component and:
at least a first one of the multiple modular functional band links electrically and mechanically connects to a wearable device; and
at least a second one of the multiple modular functional band links electrically and mechanically connects to another of the multiple modular functional band links; wherein:
the first one of the modular functional band links electrically connects to the wearable device or the second one of the modular functional band links electrically connects to the other of the multiple modular functional band links via:
conductive portions of a groove that contact conductive portions of a tongue that is inserted into the groove;
the conductive portions of the groove and the conductive portions of the tongue allow rotation with respect to each other; and
the conductive portions of the groove and the conductive portions of the tongue maintain electrical connection during the rotation.

19. The band of claim 18, wherein the tongue is inserted into the groove in a direction parallel to a length of the band.

20. The band of claim 18, wherein the conductive portions of the groove and the conductive portions of the tongue maintain physical contact during the rotation.

* * * * *